United States Patent [19]

Iannucci

[11] Patent Number: 4,922,734

[45] Date of Patent: May 8, 1990

[54] LOCKING ASSEMBLY FOR PREVENTING THE UNAUTHORIZED USE OF AN ELECTRICALLY POWERED DEVICE

[76] Inventor: Paul Iannucci, 31539 Edwood, Warren, Mich. 48093

[21] Appl. No.: 377,255

[22] Filed: Jul. 10, 1989

[51] Int. Cl.[5] ............................................. E05B 73/00
[52] U.S. Cl. ........................................... 70/58; 70/258
[58] Field of Search .................... 70/14, 58, 57, 25 B, 70/163–173

[56] References Cited

U.S. PATENT DOCUMENTS

| | | | |
|---|---|---|---|
| 4,131,001 | 12/1978 | Gotto | 70/14 |
| 4,527,405 | 7/1985 | Renick | 70/14 |
| 4,616,490 | 10/1986 | Robbins | 70/14 |

FOREIGN PATENT DOCUMENTS

| | | | |
|---|---|---|---|
| WO85/05725 | 12/1985 | European Pat. Off. | 70/58 |
| 2131219 | 6/1984 | United Kingdom | 70/58 |

Primary Examiner—Robert L. Wolfe
Attorney, Agent, or Firm—Harold W. Milton, Jr.

[57] ABSTRACT

A locking assembly for preventing the unauthorized insertion of an object into, for example, a video cassette recorder through an opening in the recorder with the assembly including a housing having an exterior structure closely corresponding to the opening provided in the recorder and defining an interior space. The assembly further includes a locking mechanism disposed within the interior of the housing and supported by the housing for locking the assembly with respect to the recorder. A stop means is moveable between extended and retracted positions for providing locking contact with the recorder and preventing the removal of the assembly when the stop means is in its extended position. The assembly also includes a lock member which is operable from the exterior of the housing for operatively moving the stop member between the extended and retracted positions. A crank mechanism is operatively connected to the stop member and to the lock member and is rotatable between first and second positions. The crank mechanism includes a crank member having at least one connecting rod operatively connected to the stop means and the crank member for moving the stop member between the retracted and extended positions.

20 Claims, 1 Drawing Sheet

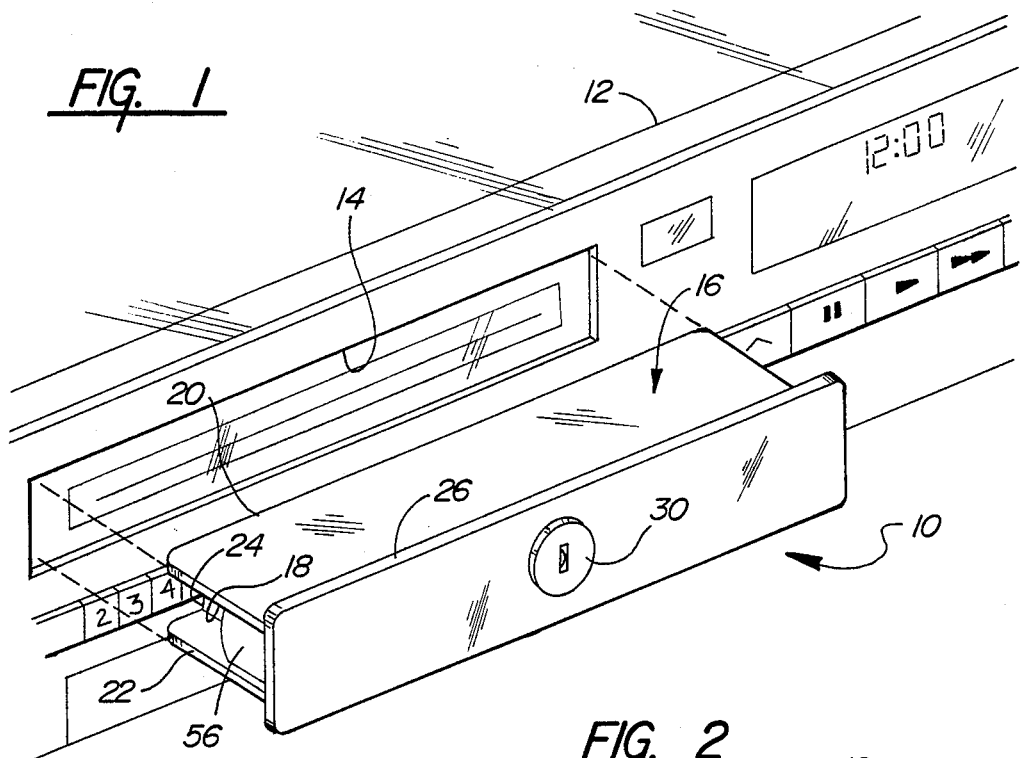
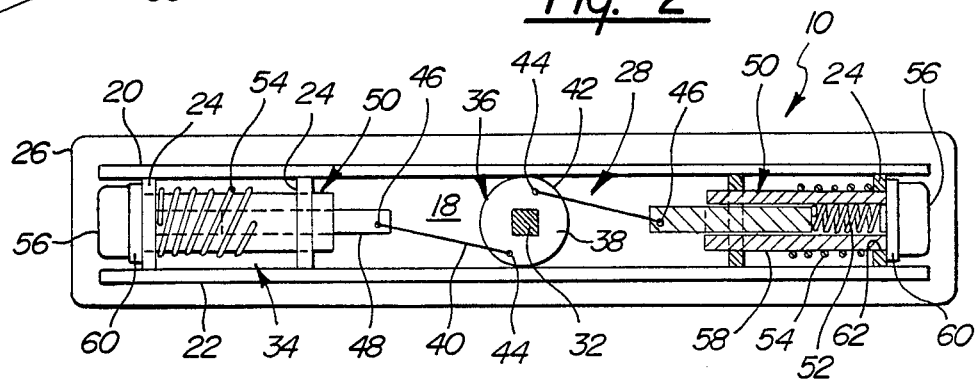
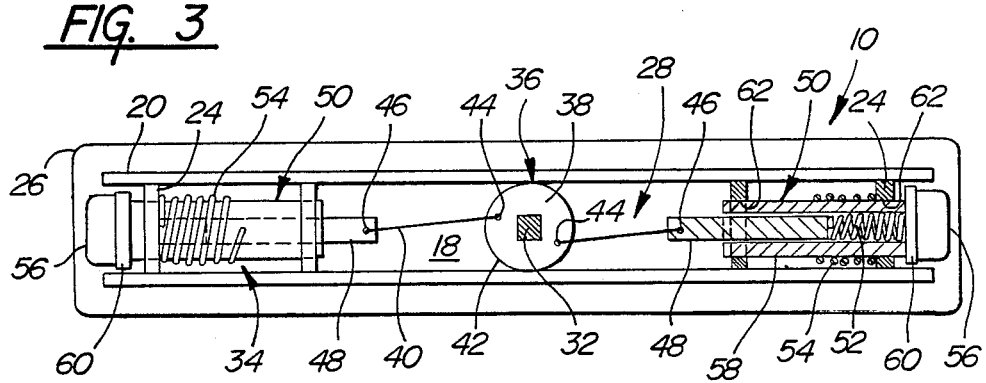

LOCKING ASSEMBLY FOR PREVENTING THE UNAUTHORIZED USE OF AN ELECTRICALLY POWERED DEVICE

BACKGROUND OF THE INVENTION

1. Technical Field

The invention relates to a locking assembly and specifically to an assembly for preventing the unauthorized use of an electrically powered device such as an audio cassette tape recorder, video cassette recorder, computer or compact disk player.

2. Background of the Invention

Locking assemblies for preventing the unauthorized use or theft of electrically powered devices such as audio cassette tape recorder, video cassette recorders and the like are known in the art. These assemblies generally take the form of a locking mechanism which is adapted to be inserted into the opening for the cassette, etc. provided by the devices to be locked. A key operated lock is most often employed to activate a mechanism to prevent the unauthorized removal of the assembly from the device. In this way, the locking assemblies of the prior art prevent the unauthorized use of the device and discourage theft. Examples of such assemblies can be found in U.S. Pat. No. 4,131,001 issued to Gotto on Dec. 26, 1978; U.S. Pat. No. 4,527,405 issued to Renick et al on July 9, 1985; U.S. Pat. No. 4,616,490 issued to Robbins on Oct. 14, 1986; and U.S. Pat. No. 4,655,057 issued to Derman on April 7, 1987.

Although the subject invention may be employed in conjunction with any electrically powered device adapted to receive a cassette, disc or the like, one possible use is with a video cassette recorder (VCR). Indeed, with the advent of the video cassette, a huge portion of the population has taking to viewing their favorite movies, etc. at home on their VCR. In fact, the VCR is almost as ubiquitous in the American home as the TV itself. Coincidently, many VCR owners are also parents of small children. Frequent use of the VCR gives the children the opportunity to observe the loading an unloading of a video tape into the VCR. Parents are many times thereafter confronted with children who have endeavored to load cookies, crackers, sandwiches and other things in the VCR which are not in accordance with proper use and which many times can cause severe damage to an expensive appliance.

However, the locking assemblies of the prior art which have endeavored to solve these and other problems have been generally complex, expensive or have the potential to damage the appliance. For example, the Gotto '001 patent discloses a locking mechanism which includes a complex and expensive gear transmission for translating rotational movement into linear movement. The locking assembly of the Renick et al '405 patent discloses a mechanism which relies on a screw driving nut for biasing a pair of cams into engagement with a cassette recorder. On the other hand, the '490 patent to Robbins as well as the '057 patent to Derman both disclose locking assemblies which include mechanisms for preventing the unauthorized withdrawal of the assembly from a cassette recorder or the like by engagement with the protective flap over the opening in the device for the cassette. However, these assemblies are prone to damaging the cassette recorders when someone attempts to remove the assembly when locked because the flaps are not designed as structural load bearing elements and can easily break under relatively small forces.

The subject invention overcomes all of these deficiencies in the prior art by providing an inexpensive, very effective locking assembly for preventing the unauthorized use of an electrically powered device.

SUMMARY OF THE INVENTION AND ADVANTAGES

The subject invention is directed toward a locking assembly for preventing the unauthorized insertion of an object into an electrically powered device such as an audio cassette recorder, video cassette recorder, compact disc player, computer or the like through an opening in the device. The locking assembly includes a housing having an exterior structure closely corresponding to the opening provided in the device and which defines an interior space. A locking means is disposed within the interior of the housing and is supported by the housing for locking the assembly with respect to the device. The locking means includes stop means movable between the extended and retracted positions for providing locking contact with the device and preventing the removal of the assembly when the stop means is in the extended position. A lock member is operable from the exterior of the housing for operatively moving the stop means between its extended and retracted positions. The assembly also includes crank means which is operatively connected to the stop means and also to the lock member and is rotatable between first and second positions. The crank means includes a crank member and at least one connecting rod operatively connecting the stop means and the crank member for moving the stop means between its retracted and extended positions.

In addition the stop means includes a first member and a second member. The first member is slideably disposed with respect to the second member. A first biasing means acts between the first and second members to bias the second member relative to the first member from a retracted position to an extended position into engagement with the device.

Accordingly, the subject invention overcomes the problems of the prior art by including a locking assembly for preventing the unauthorized use of an electrically powered device which is inexpensive, easily manufactured, and which is not susceptible to damaging the devices to be locked.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the locking assembly of the subject invention shown poised for insertion into an opening provided for a video cassette;

FIG. 2 is a cross-sectional side view of the locking assembly in its unlocked position; and FIG. 3 is a cross-sectional side view of the locking assembly of the subject invention in its locked position.

DESCRIPTION OF THE PREFERRED EMBODIMENT

A locking assembly for preventing the unauthorized insertion of an object into an electrically powered device through an opening in the device is generally shown at 10 in FIG. 1. The electrically powered device may be of any type such as an audio cassette recorder, video cassette recorder, compact disk, or computer which presents and opening for the insertion of a cassette, compact disk, floppy disk or the like. In other words, the specific type of electrically powered device is not important with respect to the subject invention. However, for illustrative purposes, the locking assembly 10 of the subject invention is shown in FIG. 1 in conjunction with a video cassette recorder (VCR) 12 having an opening 14 in the front face thereof. The assembly 10 includes a housing, generally indicated at 16, having an exterior structure which closely corresponds to the opening 14 provided in the VCR and which defines an interior space 18. The housing 16 includes upper and lower portions 20, 22 respectively and struts 24 disposed between the upper and lower portions 20, 22 to space the portions so as to present the interior space 18 and also to closely conform to the opening 14 in the VCR 12. The housing 16 further includes a back plate 26 which extends between the upper and lower portions 20, 22 to limit the distance the housing 16 may be inserted into the opening 14 of the VCR 12. When inserted into the opening 14, a portion of the back plate 26 will be in flush engagement with the front face of the VCR 12.

The locking assembly 10 further includes locking means, generally shown at 28, disposed within the interior space 18 of the housing 16 and supported by the housing 16 for locking the assembly 10 with respect to the device such as the VCR 12. A lock member 30 which is operable from the exterior of the housing 16 is included for operatively moving the mechanism of the locking means 28 into locking engagement with the VCR 12 as will be described in detail below. The locked member 30 may be of any type calculated to actuate the locking mechanism of the assembly 1O. In the preferred embodiment of the subject invention, however, the lock member 30 may be a standard cylinder lock having a shaft 32 extending into the interior space 18 of the housing 16 and being rotatable about an axis.

The locking means 28 includes a stop means, generally shown at 34, movable between extended an retracted positions for providing locking contact with the VCR 12 and preventing the removal of the assembly 10 when the stop means 34 is in its extended position. Crank means, generally indicates at 36, is operatively connected to the stop means 34 and the lock member 30 and is rotatable between first and second positions. The crank means 36 includes a crank member 38 and at least one connecting rod 40 which is operatively connected to the stop means 34 and the crank member 38. That is to say, the connecting rod 40 is disposed between and interconnects the stop means 34 and the crank member 38 for moving the stop means 34 between its retracted and extended positions. More specifically, the crank member 38 is rotatable between first and second positions about an axis which is parallel to the axis of rotation of the shaft 32 of the lock member 30 for moving the stop means 34 between its retracted and extended positions. The crank member includes a disk 38 having an outer periphery 42 and which is fixedly connected to the shaft 32 of the lock member 30 and is thus rotatable about an axis parallel to the axis of rotation of the shaft 32. The disk 38 is substantially circular in cross section but may be oval in shape or take on any other geometric configuration.

The connecting rod 40 has first and second ends 44, 46, respectively, and is operatively connected at its first end 44 to the disk 38 and at its second end 46 to the stop means 34. More specifically, the locking assembly 10 of the subject invention includes two connecting rods 40 having first and second ends 44, 46. Each rod 40 is operatively connected to substantially opposite positions with respect to one another on the disk 38 at their first ends 44. Further, each connecting rod 40 are operatively connected at their seconds ends 46 to the stop means 34.

The stop means 34 includes a first member 48 and a second member, generally indicated at 50. The first member 48 is slideably disposed with respect to the second member 50. A first biasing means 52 acts between the first 48 and second 50 members to bias the second member 50 relative to the first member 48 into engagement with the device 12. A second biasing means 54 acts between the housing 16 and the second member 50 for biasing the second member 50 from its extended position to its retracted positions out of engagement with the device 12. The stop means 34 is symmetrically disposed about the disk 38 of the crank means 36. More specifically, there is a stop means 34 associated with each connecting rod 40 as shown in FIGS. 2 and 3.

The first member includes a plunger 48 which is operatively connected to the second end 46 of the connecting rods 40. The first biasing means 52 acts between plunger 48 and the second member 50 to bias the second member 50 into engagement with the device 12 when said disk 38 is rotated to its second position to move the second member 50 to its extended position. The second member 50 includes a stop pad 56 and a hollow tubular member 58. A base member 60 is disposed between the stop pad 56 and the hollow tubular member 58 for mounting the stop pad 56 to the hollow tubular member 58. The plunger 48 is disposed within the hollow tubular member 58. The first biasing means 52 is also disposed within the hollow tubular member 58 and acts between the plunger 48 and the base member 60 to bias the entire second member 50, including the stop pad 56 and the tubular member 58, so that the stop pad 56 is moved into engagement with the device 12 when the disk 38 is rotated from its first position to its second position. In this way, the stop pad 56 is moved to an extended position.

The second biasing means 54 acts between the struts 24 which space upper and lower portions 20, 22, respectively, of the housing 16 and the tubular member 58. Thus, the second biasing means 54 biases the stop pad 56 of the second member 50 to its retracted position when the disk 38 is rotated from its second position to its first position. More specifically, the first biasing means 52 is a coiled spring disposed within the hollow tubular member 58 and acts between the plunger 48 and the base portion 60. The second biasing means 54 is also a coiled spring but which is disposed about the periphery of the hollow tubular member 58. One free end of the coiled spring second biasing means 54 is disposed through an aperture in the hollow tubular member. In this way, the second biasing means may act between the struts 24 and the hollow tubular member to bias the second member 50 to its retracted position. Further, the struts 24 include apertures 62. The second member 50 extends through the apertures 62 in the struts 24 and is supported thereby. More specifically, the hollow tubular member 58 is supported by the struts 24 and extends through the apertures 62 in the struts. The hollow tubular member 58, in turn, slideably supports the plungers 48. In this way, the locking assembly 10 of the subject invention is smoothly and efficiently supported within the housing 16.

In operation, the locking assembly 10 of the subject invention may be operated as follows. The housing 16 containing the locking mechanism may be inserted in the opening provided for a cassette in, for example, a video cassette recorder. The housing 16 will be inserted into the opening a predetermined distance which is limited by the back plate 26. In other words, the housing may be inserted into the opening until the back plate 26 comes into abutting contact with the face of the device 12 such as a VCR. The lock member 30 may then be actuated. In the preferred embodiment of the subject invention, the lock member 30 is actuated by inserting a key into an opening in the lock member and rotating in either the clockwise or counter clockwise direction. The shaft 32 is thereby rotated causing the crank member or disk 38 to be similarly rotated about an axis parallel to the axis of rotation of the shaft 32. This rotation causes the connecting rod 40 to impart a force on the plungers 48 which are slideably dispose within the hollow tubular member 58. The movement of the plunger 48 against the first biasing means 52 causes the second member 50 and thus the hollow tubular member 58 and stop pad 56 to be biased from their retracted position to their extended position into engagement with the VCR 12. In this disposition, the opening 14 in the VCR 12 is thereby securely covered and the device may not be removed. In this way, the unauthorized use of the VCR may be prevented.

To disengage the locking assembly from the VCR, the shaft 32 of the lock member 30 is then rotated in the direction opposite to the initial direction of rotation to impart an opposite force on the plungers 48 through the connecting rods 40 as was originally imposed. This reduces the biasing force on the first biasing means 52 and thus the second member 50. When the reduction in this biasing force reaches a predetermined level, the biasing force of the second biasing means 54 will bias the second member 50 from its extended position in locking contact with the VCR 12 to its retracted position and out of contact with the VCR. The locking assembly 10 may then be removed from the opening 14 in the VCR 12.

The invention has been described in an illustrative manner, and it is to be understood that the terminology which has been used is intended to be in the nature of words of description rather than limitation.

Obviously, many modifications and variations of the present invention are possible in light of the above teachings may be made. It is, therefore, to be understood that within the scope of the appended claims, the invention may be practiced otherwise than as specifically described.

What is claimed is:

1. A locking assembly for (preventing the unauthorized insertion of an object into an electrically powered device through an opening in the device), said assembly comprising;
   a housing having an exterior structure closely corresponding to the opening provided in the device and defining an interior space;
   locking means disposed within said interior of said housing and supported by said housing for locking said assembly with respect to the device;
   said locking means including stop means movable between extended and retracted positions for providing locking contact with the device and preventing the removal of said assembly when said stop means is in said extended position;
   a lock member operable from the exterior of said housing for operatively moving said stop means between said extended and retracted positions;
   crank means operatively connected to said stop means and said lock member and being rotatable between first and second positions, said crank means including a crank member;
   said lock member having a shaft extending into the interior of said housing and being rotatable about an axis, said crank member being rotatable between first and second positions about an axis which is parallel to said axis of rotation of said shaft;
   said crank member including a disk having an outer periphery and fixedly connected to said shaft and rotatable about an axis parallel to said axis of rotation of said shaft, said assembly characterized by said crank means including two connecting rods having first and second ends and being operatively connected to substantially opposite positions with respect to one another on said disk at said first ends and being operatively connected at said second end to said stop means for moving said stop means between said retracted position and said extended position.

2. A locking assembly for preventing the unauthorized insertion of an object into an electrically powered device through an opening in the device, said assembly comprising;
   a housing having an exterior structure closely corresponding to the opening provided in the device and defining an interior space;
   locking means disposed within said interior of said housing and supported by said housing for locking said assembly with respect to said device;
   said locking means including stop means movable between extended and retracted positions for providing locking contact with said device and preventing the removal of said assembly when said stop means is in said extended position;
   said assembly characterized by said stop means including a first member and a second member, said first member slideably disposed with respect to said second member and a first biasing means acting between said first and second members to bias said second member relative to said first member from a retracted position to an extended position into engagement with said device.

3. An assembly as set forth in claim 2 further characterized by including a second biasing means acting between said housing and said second member for biasing said second member from said extended position to said retracted position out of engagement with said device.

4. An assembly as set forth in claim 3 further characterized by including a lock member operable from the exterior of said housing for slideably moving said first member with respect to said second member to move said second member relative to said first member from a retracted position to an extended position into engagement with said device.

5. An assembly as set forth in claim 4 further characterized by including crank means operatively connected to said first member and to said lock member and being rotatable between first and second positions to move said first member slideably with respect to said second member.

6. An assembly as set forth in claim 5 further characterized by said crank means including a crank member and at least one connecting rod operatively connected to said first member and said crank member for moving said first member slideably with respect to said second member.

7. An assembly as set forth in claim 6 further characterized by said lock member having a shaft extending into the interior of said housing and being rotatable about an axis.

8. An assembly as set forth in claim 7 further characterized by said crank members being rotatable between first and second positions about an axis which is parallel to said axis of rotation of said shaft for moving said first member slideably with respect to said second member.

9. An assembly as set forth in claim 8 further characterized by said crank member including a disk having an outer periphery and fixedly connected to said shaft and rotatable about an axis parallel to said axis of rotation of said shaft.

10. An assembly as set forth in claim 9 further characterized by said connecting rod including first and second ends and being operatively connected at said first end to said disk and at said second end to said first member of said stop means.

11. An assembly as set forth in claim 10 further characterized by including two connecting rods having first and second ends and being operatively connected at said first ends to substantially opposite positions with respect to one another on said disk and being operatively connected at said second end to said first member of said stop means.

12. An assembly as set forth in claim 1 further characterized by said stop means including a first member and a second member, said first member slideably disposed with respect to said second member and a first biasing means acting between said first and second members to bias said second member relative to said first member into engagement with said device.

13. An assembly as set forth in claim 12 further characterized by including a second biasing means acting between said housing and said second member for biasing said second member from said extended position to said retracted position out of engagement with said device.

14. An assembly as set forth in claims 13 or 11 further characterized by said first member including a plunger operatively connected to said second end of said connecting rods, said first biasing means acting between plunger and the second member to bias the second member into engagement with the device when said disk is rotated to said second position to move said second member to said extended position.

15. An assembly as set forth in claim 14 further characterized by said second member including a stop pad, a hollow tubular member and a base member disposed between said stop pad and said hollow tubular member for mounting said stop pad to said hollow tubular member.

16. An assembly as set forth in claim 15 further characterized by said plunger being disposed within said hollow tubular member, said first biasing means being disposed within said hollow tubular member and acting between said plunger and said base member to bias the stop pad into engagement with the device when said disk is rotated from said first position to said second position to move said stop pad to said extended position.

17. An assembly as set forth in claim 16 further characterized by said housing including upper and lower portions and struts disposed between said upper and lower portions to space said portions to closely conform to the opening in the device and a back plate extending between the upper and lower portions to limit the distance the housing may be inserted into the opening of the device.

18. An assembly as set forth in claim 17 further characterized by said second biasing means acting between said struts and said tubular member for biasing said stop pad to said retracted position when said disk is rotated from said second position to said first position.

19. An assembly as set forth in claim 18 further characterized by said first biasing means being a coiled spring disposed within said hollow tubular member and acting between said plunger and said base portion, said second biasing means being a coiled spring disposed about the periphery of said hollow tubular member and acting between said struts and said hollow tubular member.

20. An assembly as set forth in claim 19 further characterized by said struts including apertures, said hollow tubular member extending through said apertures in said struts and being supported thereby.

* * * * *